J. HENLEY.
STEREOSCOPIC PROJECTING MACHINE.
APPLICATION FILED APR. 2, 1918.
1,284,673.
Patented Nov. 12, 1918.
2 SHEETS—SHEET 2.
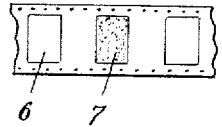
Fig. 3
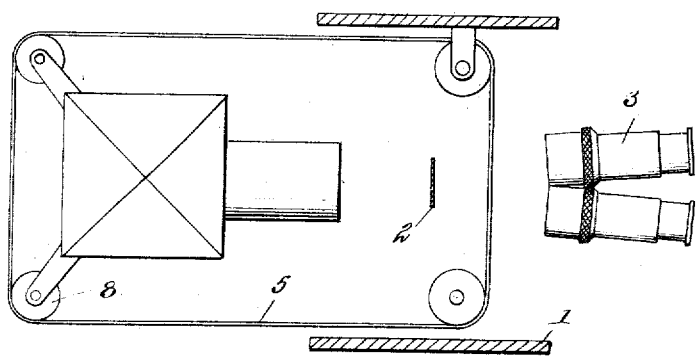
Fig. 2
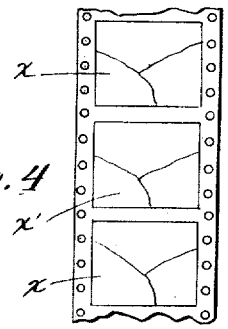
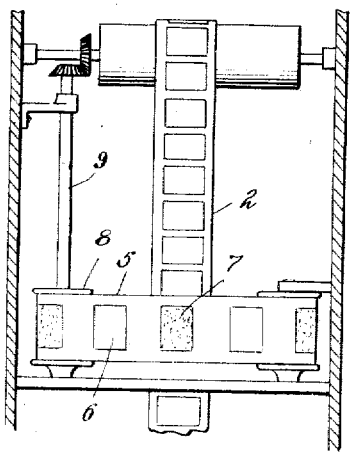
Fig. 4
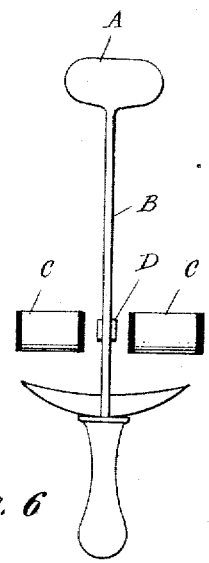
Fig. 5
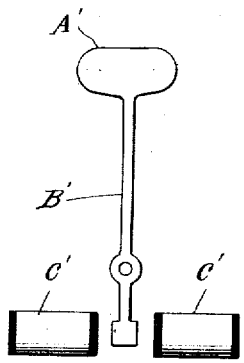
Fig. 6  Fig. 7
Witness
O. F. Rudolph
L. B. Middleton
Inventor
John Henley,
By Victor J. Evans
Attorney

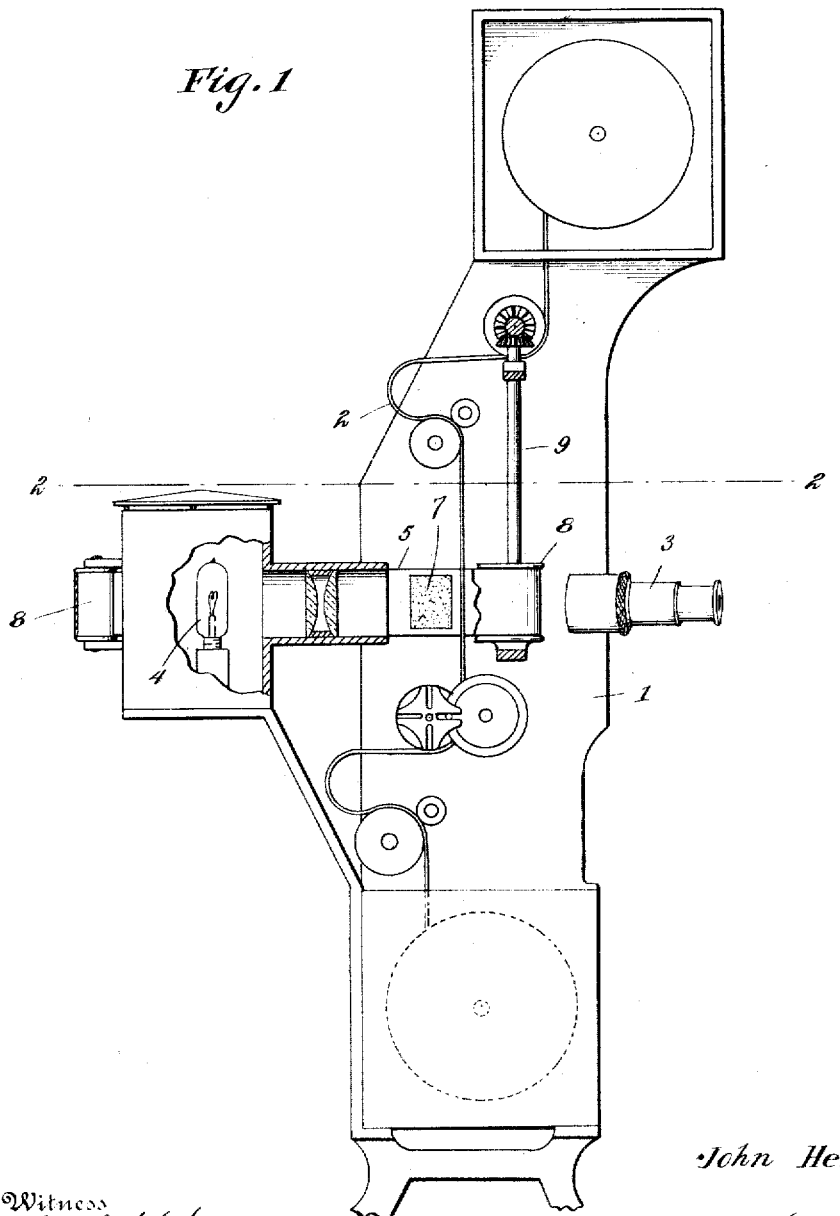

UNITED STATES PATENT OFFICE.

JOHN HENLEY, OF CHARLEMONT, MOY, IRELAND.

STEREOSCOPIC PROJECTING-MACHINE.

1,284,673.  Specification of Letters Patent.  Patented Nov. 12, 1918.

Application filed April 2, 1918. Serial No. 226,240½.

*To all whom it may concern:*

Be it known that I, JOHN HENLEY, a subject of the King of England, residing at Charlemont, Moy, in the county of Tyrone, Ireland, have invented new and useful Improvements in Stereoscopic Projecting-Machines, of which the following is a specification.

This invention relates to the securing of stereoscopic relief with cinematographs and kindred instruments for producing motion pictures. The invention has for its object to provide an improved method of viewing said pictures and the means for carrying out said method.

In this invention the images are taken separately and are alternately arranged upon a length of film in a stereoscopic manner and the pictures are viewed through means arranged to alternately permit one eye to have a clear vision while dimming the view of the other eye.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side elevation partly in section of a cabinet containing the machine.

Fig. 2 is a section on line 2—2 of Fig. 1.

Fig. 3 is a detail view of the strip or ribbon showing the different apertures.

Fig. 4 is a detail view of the film.

Fig. 5 is a front elevation of the film and ribbon or strip with the driving connection.

Figs. 6 and 7 are views showing different means of carrying out the invention.

In taking the pictures two cameras are used. They run synchronously and are mounted so that their distance apart and the angle of inclination of their axes (considered as the axes of the lenses) may be varied according to the nature of the subject. Each instrument is fitted on top with crosswire finder so that the axes of both may be directed accurately to the same particular part of the principal subject. In viewing or projecting the picture only a single film is used, the records from the two taking instruments being printed on the same positive film in such a manner that the pictures alternate with each other. In order to obtain true stereoscopic relief the pictures taken by the left hand recording instrument must be viewed with the left eye and similarly as regards the right hand instrument. This necessitates the use of an occulting apparatus which, according to this invention, is such that one eye has a clear view of any particular picture and the other eye has a dim view of that picture, these clear and dim views alternating from eye to eye with successive pictures. The particular design of the occulating apparatus will partly depend upon whether the pictures are to be viewed by a single individual or collectively by a number of persons. In the former case the film and driving mechanism are inclosed in a cabinet containing an electric bulb, or equivalent, suitably placed for the illumination of the film. The film is viewed under magnification through a pair of lenses capable of adjustment to suit the requirements of different observers. The film runs through the machine, each picture being locked in turn as in ordinary cinematographic projection, but there passes behind the viewing lenses portion of a continuous steel or celluloid ribbon, or equivalent. The steel ribbon contains alternate perforations providing clear openings of any suitable shape, while the other openings consist of a number of very fine holes close together. The object of this arrangement is to secure that at no time when viewing the pictures shall either eye be entirely deprived of light, though the picture as viewed through the second kind of perforation will be very feeble. This endless band containing the perforations is moved in the same manner as the film and is spaced so that at each stop in its movement one eye has a clear view of the film and the other a dim view. The clear view spaces alternate from eye to eye. The pictures may be changed during the time that the vision is totally obscured by the passage of the ribbon, thus dispensing with the ordinary eclipsing arrangement during the motion of the film. Thus the right and left eyes obtain a succession of clear views of the right hand and left hand aspects of the subject, as taken in the first instance by the two recording instruments, by this means securing the presentation of the picture in relief. When a celluloid or gelatin ribbon is used the perforations are replaced by alternate transparent and semi-transparent spaces, the rest of the ribbon being opaque. When considered expedient the endless ribbon may be replaced by an oscillating piece containing perforations or spaces as described and fulfilling exactly the same function as the ribbon.

The apparatus is suitable for the presentation of motion pictures in colors. In this case the left eye and right eye pictures are taken through screens approximately complementary in color and viewed through glasses or screens of the same colors. These are arranged in the instrument so that they can be moved into position opposite the right and left eyes when required.

Figs. 1 to 5 of the drawings illustrate means for carrying out this form of the invention. In these views the device is arranged in a cabinet, part of which is shown at 1 and this cabinet carries the driving mechanism, which may be of any suitable type, for driving the film and the ribbon. The film is indicated at 2 and is shown in detail in Fig. 4. As before stated the film is composed of a plurality of pairs of images each image of a pair being taken by separate cameras and arranged in an alternate manner on the strip 2. For instance image X has been taken by one camera while image X' has been taken by the second camera, said cameras being arranged as before stated. In this way a stereoscopic effect is secured. 3 indicates the pair of viewing lenses carried by the cabinet and arranged in an inclined relation so that the line of sight of both eyes will converge on the film 2. A suitable lighting medium 4 is located in the rear of said film. 5 indicates the ribbon provided with the perforations 6 and 7. The alternate perforations 6, being unobstructed while the other perforations 7 are obstructed so that a clear vision may be had through the perforation 6 while a dimmed vision is had through the perforation 7. This ribbon is supported by the four rollers 8 one of which is driven from the driving means before referred to by means of the shaft 9. It will thus be seen that each picture on the film is viewed by both eyes, the one giving a clear view and the other a dim view of said picture. The next picture is viewed in the same manner but the obstructed view is transmitted to the other eye.

When it is desired to project the pictures on a screen so that they can be viewed by a large number of persons simultaneously the film is prepared from the stereoscopic records as already described. The occulting apparatus in this case consists of a light metal electrical vibrator with which each spectator is provided. Its essential features are shown in Fig. 6. A is a sector of colored gelatin, or celluloid, or equivalent so that the occultation is never total. It is mounted at the end of a light metal rod B, carried by a suitable handle, and the whole arrangement has a vibration period as nearly as possible the same as the average time occupied by the showing of a single picture. Thus if the pictures are presented at the rate of, say, 15 per second, the vibrator will make one vibration in one-fifteenth of a second. This renders the electrical control of the apparatus very simple, only a feeble current being required. At each side of the rod B near the base an electromagnet C is fixed, and opposite it on the rod a pole piece D. The moving part of the vibrator is brought to rest after each swing by a point or knife-edge contact upon rubber, or equivalent cushioning means; so that its movements are not attended with noise.

If it is required to run the films through the projector at different rates the light rod is replaced by a more rigid one, B', Fig. 7, and the electrical controls are placed underneath as at C', C'.

For color projection the left hand and right hand cameras are fitted with taking screens which transmit approximately complementary colors. Call the transmitted colors "A light" and "B light" respectively. The pictures are taken and printed as before but the printed pictures from the left hand camera are stained "A" thus giving an "A light" impression and those from the right hand camera are stained "B," giving the complementary light impression. In this case the vibrator sector is fitted with two pieces of colored gelatin, or equivalent (A and B stained), fitted side by side and so placed that the pictures taken with the left hand instrument are viewed through the B stained gelatin by the right eye, affording a dim view, through lack of contrast, of the left hand picture by the right eye and similarly for the right hand picture when viewed by the left eye.

It is thought from the foregoing description that the advantages and novel features of my invention will be readily apparent.

I desire it to be understood that I may make minor changes in the construction and in the combination and arrangement of the several parts, provided that such changes fall within the scope of the appended claims.

What I claim is:—

1. The herein described method of viewing cinematograph pictures stereoscopically prepared consisting in alternately dimming the vision of one eye while permitting a clear view by the other eye.

2. A motion picture machine for viewing cinematograph pictures stereoscopically prepared comprising means for alternately dimming the vision of one eye while permitting a clear view by the other eye when viewing said pictures.

3. A motion picture machine for viewing cinematograph pictures stereoscopically prepared comprising means for alternately dimming the vision of one eye while permitting a clear view by the other eye when viewing said pictures, said means comprising an endless ribbon provided with perforations, alternate perforations being partly obstructed while the other perforations are unobstructed.

4. A motion picture machine for viewing cinematograph pictures stereoscopically prepared comprising means for alternately dimming the vision of one eye while permitting a clear view by the other eye when viewing said pictures, said means comprising an endless ribbon provided with perforations, alternate perforations being partly obstructed while the other perforations are unobstructed, said perforations being spaced apart so that the portions of the ribbon between the perforations may be used for totally eclipsing the pictures when changing the film.

5. A motion picture machine comprising means to move a film having alternate left and right images and means for alternately dimming the vision of one eye while permitting a clear view by the other eye when viewing said images, said means comprising a member having a clear opening therein and an obstructed opening.

In testimony whereof I affix my signature.

JOHN HENLEY.